(12) United States Patent
Meriac et al.

(10) Patent No.: US 10,725,873 B2
(45) Date of Patent: Jul. 28, 2020

(54) LOCKSTEP PROCESSING SYSTEMS AND METHODS

(71) Applicant: Arm Limited, Cambridge (GB)

(72) Inventors: Milosch Meriac, Cambridge (GB); Shidhartha Das, Upper Cambourne (GB)

(73) Assignee: Arm Limited, Cambridge (GB)

( * ) Notice: Subject to any disclaimer, the term of this patent is extended or adjusted under 35 U.S.C. 154(b) by 152 days.

(21) Appl. No.: 15/995,469

(22) Filed: Jun. 1, 2018

(65) Prior Publication Data

US 2019/0370130 A1   Dec. 5, 2019

(51) Int. Cl.
*G06F 11/00*   (2006.01)
*G06F 11/16*   (2006.01)
*G06F 1/12*    (2006.01)

(52) U.S. Cl.
CPC ............ *G06F 11/1658* (2013.01); *G06F 1/12* (2013.01); *G06F 11/1604* (2013.01); *G06F 2201/86* (2013.01)

(58) Field of Classification Search
CPC .. G06F 11/1658; G06F 11/1604; G06F 11/16; G06F 11/1608; G06F 11/1629; G06F 11/1641; G06F 11/165; G06F 1/12; G06F 1/32; G06F 1/3287; G06F 2201/86
See application file for complete search history.

(56) References Cited

U.S. PATENT DOCUMENTS

| | | | | |
|---|---|---|---|---|
| 6,167,560 A | * | 12/2000 | Jenkins, IV | ....... H03K 19/1736 326/38 |
| 2005/0240811 A1 | * | 10/2005 | Safford | ............... G06F 11/1641 714/11 |
| 2014/0361819 A1 | * | 12/2014 | Lundberg | .............. G06F 1/3234 327/198 |
| 2016/0239065 A1 | * | 8/2016 | Lee | ......................... G06F 1/324 |
| 2016/0294281 A1 | * | 10/2016 | Kulkarni | ................. G06F 3/041 |
| 2017/0357557 A1 | * | 12/2017 | Jain | ..................... G06F 11/1604 |

* cited by examiner

*Primary Examiner* — Anthony J Amoroso
(74) *Attorney, Agent, or Firm* — Leveque IP Law, P.C.

(57) ABSTRACT

The present techniques generally relate to a method of monitoring for a fault event in a lockstep processing system having a plurality of cores configured to operate in lockstep, the method having: power gating, for a period of time, a subset of cores of the plurality of cores from a first power source and providing power to the subset of cores from a second power source for the period of time; processing, at each of the cores of the plurality of cores, one or more instructions; providing an output from each core of the plurality of cores to error detection circuitry to monitor for the fault event, the output from each core based on or in response to processing the one or more instructions during the period of time.

20 Claims, 7 Drawing Sheets

US 10,725,873 B2

LOCKSTEP PROCESSING SYSTEMS AND METHODS

FIELD OF THE DISCLOSURE

The present techniques generally relate to lockstep processing systems and methods.

BACKGROUND

As data processing devices become ubiquitous, the importance of performance, efficiency and reliability of such devices has increased given their use in safety critical equipment (e.g. from equipment for space agencies and satellite manufacturers to autonomous vehicles to medical implants).

One solution for increasing the reliability of data processing devices is to modify a processor thereof to provide redundant components at Register Transfer Level (RTL). However, such modifications may impact performance and increase design costs.

Another solution for increasing the reliability of data processing devices may be to use a radiation hardening (rad-hard) process technology. However, rad-hard process technology generally increases manufacturing costs.

The present techniques seek to provide improvements over the prior art.

DESCRIPTION OF THE DRAWINGS

The present techniques provide lockstep processing systems and methods for detecting fault events in a system with reference to the accompanying drawings. Like numbers refer to like elements throughout. The present techniques are diagrammatically illustrated, by way of example, in the accompanying drawings, in which.

DETAILED DESCRIPTION

Figure 1:
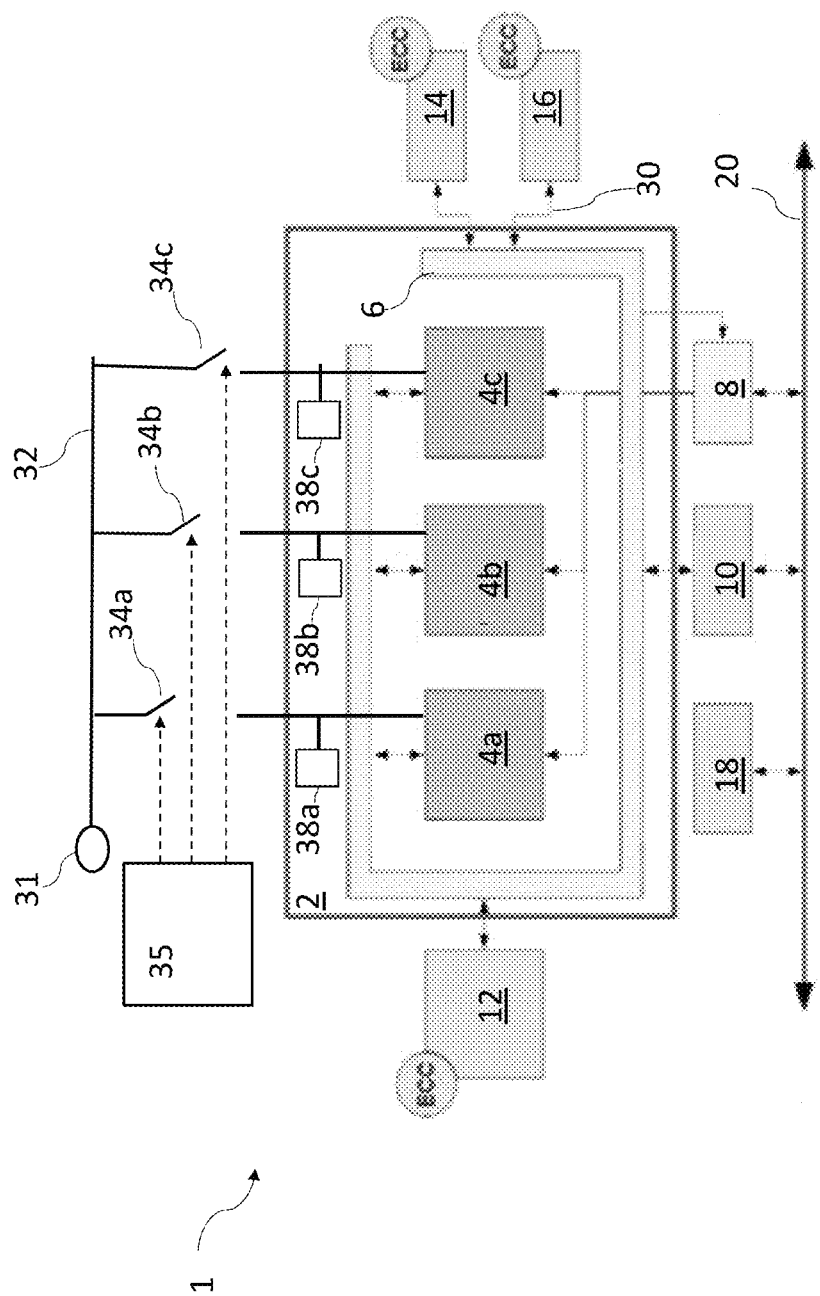
FIG. 1 illustratively shows a block diagram of a processor system comprising a multicore lockstep system.

According to a first technique there is provided a method of monitoring for a fault event in a lockstep processing system comprising a plurality of cores configured to operate in lockstep, the method comprising: power gating, for a period of time, a subset of cores of the plurality of cores from a first power source and providing power to the subset of cores from a second power source for the period of time; processing, at each of the cores of the plurality of cores, one or more instructions; providing an output from each core of the plurality of cores to error detection circuitry to monitor for the fault event, the output from each core based on or in response to processing the one or more instructions during the period of time.

According to a further technique there is provided a non-transitory computer readable storage medium comprising code which when implemented on a processor causes the processor to carry out a method of monitoring for a fault event in a lockstep processing system comprising a plurality of cores configured to operate in lockstep, the method comprising: power gating, for a period of time, a subset of cores of the plurality of cores from a first power source and providing power to the subset of cores from a second power source; processing, at each of the cores of the plurality of cores, one or more instructions; providing an output from each core of the plurality of cores to error detection circuitry to monitor for the fault event, the output from each core based on or in response to processing the one or more instructions during the period of time.

According to a further technique there is provided a processor system comprising: a plurality of cores to process instructions in a lockstep configuration; a control unit to power gate, for a period of time, a subset of the plurality of cores from a first power source and provide power to the subset of cores from a second power source; and error detection circuitry to receive outputs from each of the plurality of cores to monitor for a fault event during the period of time.

According to a further technique there is provided a multicore lockstep system comprising: a plurality of cores to process instructions in a lockstep configuration, each core of the plurality of cores to be coupled to one of first power source and a second power source when processing one or more instructions for a period of time; and error detection circuitry to receive an output from each core of the plurality of cores to monitor for a fault event, the output from each core based on or in response to processing the one or more instructions during the period of time.

According to a further technique there is a method of monitoring for a fault event in a lockstep processing system comprising a plurality of cores configured to operate in lockstep, the method comprising: powering each core of the plurality of cores with a respective power source for a period of time; processing one or more instructions at each of the plurality of cores; providing the outputs of each core of the plurality of cores to error detection circuitry to monitor for the fault event, the output based on or in response to processing the one or more instructions for the period of time.

FIG. 1 illustratively shows a block diagram of a processor system 1 having a multicore lockstep system 2.

In the present illustrative example, the multicore lockstep system 2 comprises three processing elements 4a-4c hereafter "cores" arranged in a triple core lockstep (TCLS) configuration. In the present illustrative example each core may comprise a central processing unit (CPU) of an Arm® Cortex®-R5 dual-core processor by Arm® Cambridge, UK, although the claims are not limited in this respect.

Each core of the multicore lockstep system shares various units or components of the system 1 such as a lockstep assist unit 6, vectorised interrupt controller (VIC) 8, network interconnect 10 (e.g. Advanced Microcontroller Bus Architecture (AMBA) network interconnect).

The processor system 1 also includes one or more buses 20 through which the cores 4a-4c can write data to circuitry coupled thereto such as storage circuitry and/or peripheral devices (not shown).

The one or more buses 20 may be based on the AMBA standard and may comprise one or of an Advanced System Bus (ASB), Advanced Peripheral Bus (APB), Advanced High-performance Bus (AHB) and Advanced Extensible Interface (AXI), although the claims are not limited in this respect.

The one or more buses 20 may implement error detection and correction mechanisms which may be based on parity and/or error-correcting codes (ECC) such as a single-error correction and double-error detection (SECDED).

In the present illustrative example, the system 1 comprises storage circuitry illustratively shown in FIG. 1 as tightly coupled memory (TCM) 12, data-cache (D-Cache) 14 and instruction cache 16 (I-Cache), whilst the storage circuitry 18 comprises Level 2 memory. However, the storage circuitry 12-18 is not limited to the examples depicted in FIG. 1 and may comprise other types of volatile or non-volatile storage circuitry.

The storage circuitry 12-16 may also implement error detection and correction mechanisms, which may be based on parity and/or ECC (e.g. SECDED), whereby ECCs are appended to all TCM 12 and cache 14, 16 and Level 2 entries and verified before data is processed by the cores 4a-4c, although the claims are not limited in this respect.

In embodiments the lockstep assist unit 6 functions as an error propagation boundary in the system, which allows the lockstepped cores to write data to the storage circuitry (e.g. D-Cache 14) and/or peripherals devices when determined to be appropriate (e.g. when processing of an instruction completes and no fault event is detected).

As depicted in FIG. 1, each core of the multicore lockstep system 2 may be powered by a primary power source (e.g. a VDD) to which each of the cores can be selectively electrically coupled by controlling the switch logic 34a-34c. Each core of the multicore lockstep system 2 may also be powered by a secondary power source (depicted as individual power sources 38a-c), to which each of the cores can be selectively electrically coupled (e.g. by controlling the switch logic not shown in FIG. 1)

The secondary power source may comprise one or more of: a capacitive element(s), battery(s), energy harvester(s) (e.g. a mechanical energy harvester, a solar harvester, wi-fi harvester etc.).

In some embodiments the secondary power source 38 may be integrated into or integral to the processor system or multicore system such that it is not electrically coupled to any external or off-chip power lines. Additionally, or alternatively, the secondary power source may be provided as one or more external or off-chip components like decoupling capacitors or power supply units (e.g. connected to the processor system or multicore system via external pins).

Figure 2:
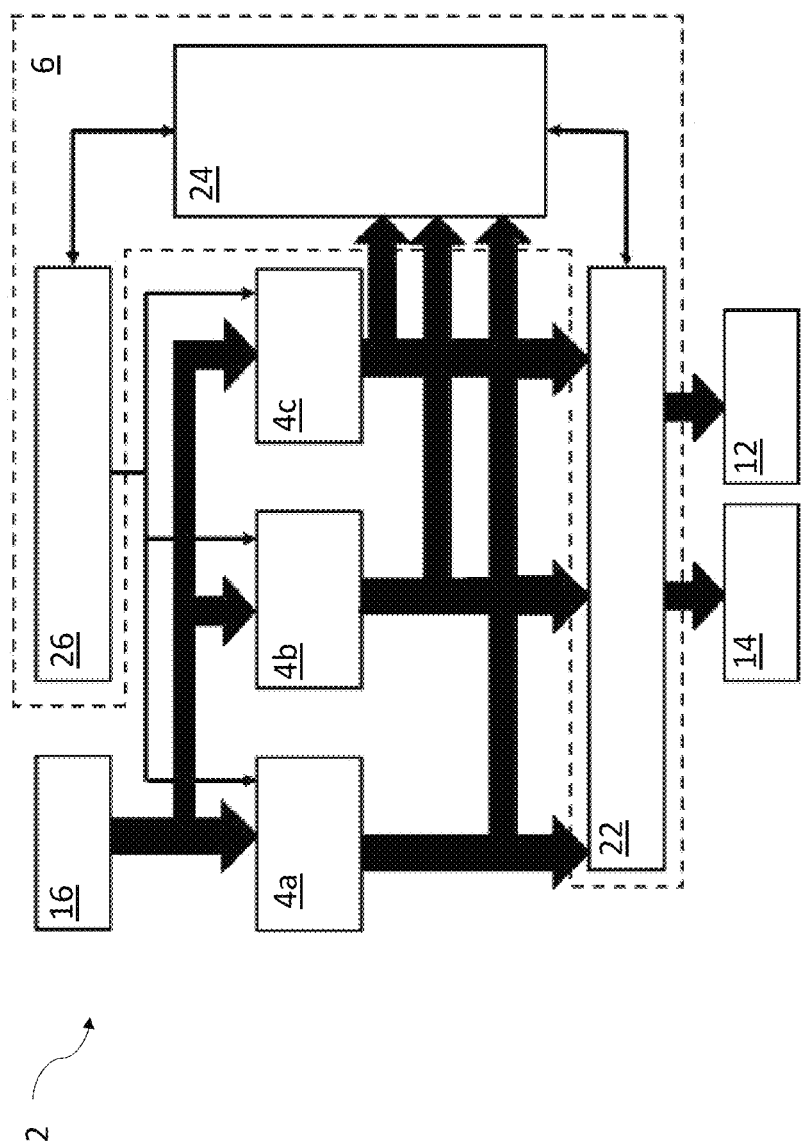
FIG. 2 illustratively shows a block diagram of the multicore lockstep system of FIG. 1 according to an embodiment.

FIG. 2 illustratively shows a block diagram of the multicore lockstep system 2, whereby, in operation, one or more instructions are fetched from storage (e.g. I-Cache 16) and the same one or more instructions processed in lockstep by the cores over one or more clock cycles.

It will be appreciated that processing an instruction includes one or more of fetching, decoding, executing and completing an instruction, and each core may generate an output resultant from processing an instruction every clock cycle, although the claims are not limited in this respect and the output may be generated for different clock pulses.

In an illustrative example, an output may comprise data from one or more execution units (e.g. an integer execution unit (IEU), load-store units (LSU), multiply and divide units (MDU)), whereby such data may comprise temporary results which do not or are not intended to change the architectural state of the processor (e.g. from partially completed instructions), or whereby such data may comprise results which are to be committed to the architectural state of the processor (e.g. from completed instructions).

The lockstep assist unit 6 comprises voter circuitry 22, error detection circuitry 24 and recovery circuitry 26, whereby when an instruction completes, the outputs from the cores 4a-4c are compared by the error detection circuitry 24 to monitor for a fault event or error (e.g. divergence amongst the outputs), and when no fault event is detected (e.g. if the outputs from all the cores are the same), the output from the voter circuitry 22 (e.g. majority voter circuitry) may be written to an appropriate location (e.g. D-Cache 14, Level 2 memory 18, peripheral device etc.).

Upon detection of a fault event (e.g. if there is divergence between the outputs of one or more of the different cores 4a-4c), the error detection circuitry 24 causes the recovery circuitry 26 to initiate a recovery action and/or prevent an output from the voter circuitry being written to a particular location. Such a fault event may be caused by one of the cores malfunctioning and generating the diverging output.

Looking again at the illustrative example of FIG. 1, the individual cores 4a-4c may be power gated by controlling switch logic 34a-c, and such functionality provides detection of a fault event at the primary power source 31 or along the power rails 32, which would affect all cores (i.e. a common mode fault).

In the following illustrative examples, when switch logic 34a-c is described as "on" or "closed" current can pass therethrough whilst when described as "off" or "open", current is prevented from flowing therethrough.

Such switch logic 34 may comprise one or more switch elements such as transistors implemented using CMOS technology, although the claims are not limited in this respect.

In the present illustrative example, the switch logic 34a-34c is controlled to be open/closed based on or in response to switch control signals 36a-c from switch control unit 35.

In operation, the switch control unit 35 generates switch control signals 36a-c to control the switch logic 34a-c such that a subset (at least one but not all) of the cores 4a-4c are electrically isolated or electrically decoupled from the primary power source 31 for a particular period of time (e.g. for one or more clock cycles).

When a subset of the cores 4a-4c is electrically isolated from the primary power source 31, each core in the subset of the cores 4a-4c is powered by the secondary power source 38a-c to process one or more instructions.

The switch control unit 35 may comprise circuitry or logic to control the switch logic 34a-c to power gate or electrically isolate a subset of the cores from the primary power source 31 using any suitable control scheme (e.g. a round-robin, random, pseudorandom). For example, the switch control unit 35 may comprise an application specific integrated circuit (ASIC) or field programmable gate array (FPGA) to generate switch control signals. In other examples the switch control unit may comprise a microcontroller to generate the switch control signals.

In embodiments, the control unit 35 may power gate a majority of the cores from the common primary power source 31 which, in a TCLS configuration, provides for detection of the CMF fault event at the primary power source 31 or power rail 32, and identification of the affected core. In embodiments, the control unit 35 may power gate a minority of the cores from the common primary power source 31 which, for a TCLS configuration, provides for detection of the CMF fault event at the primary power source 31 or power rail 32.

Figure 3:
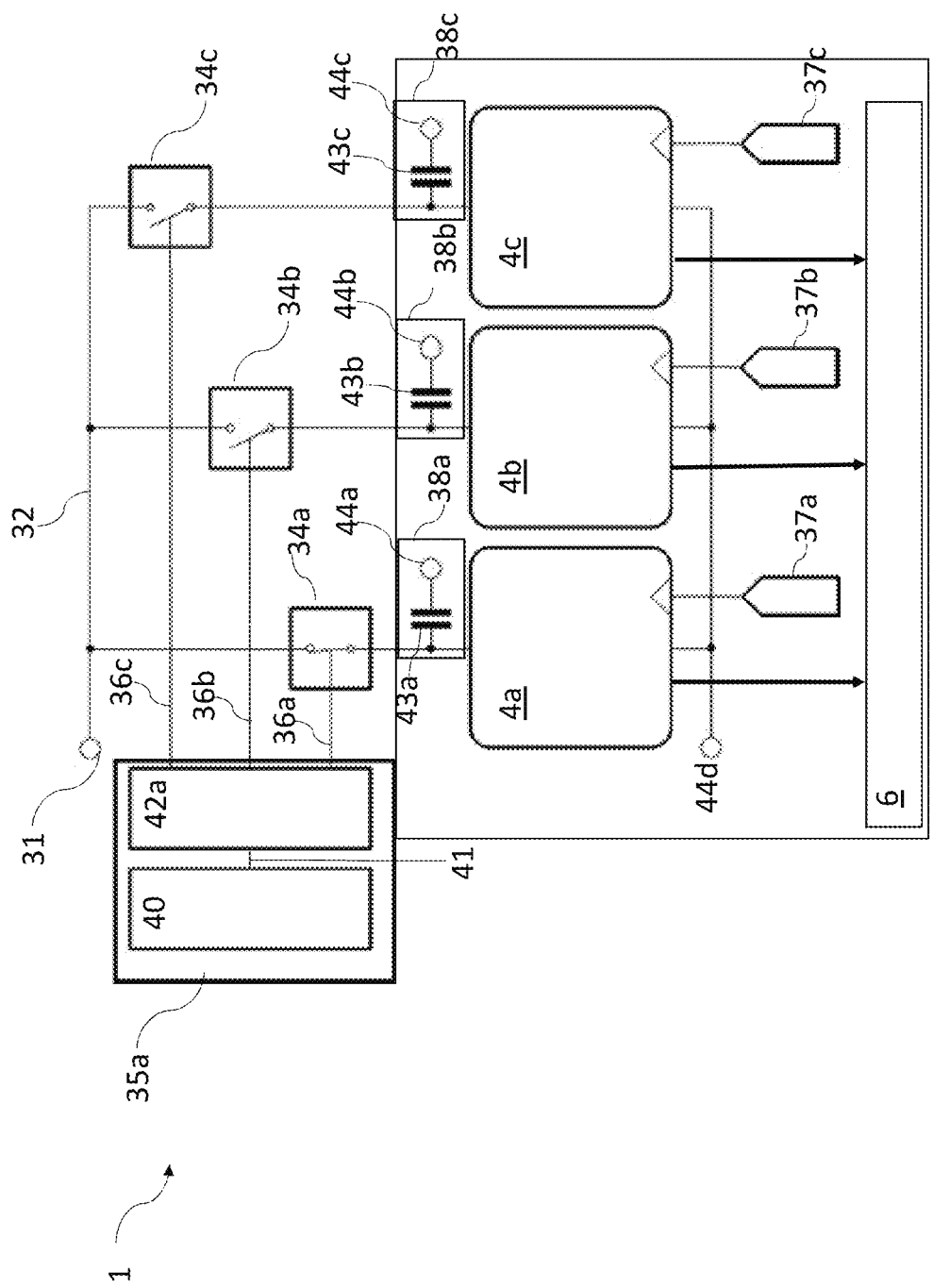
FIG. 3 illustratively shows a block diagram of a switch control unit for the multicore lockstep system of FIG. 2 according to an embodiment.

FIG. 3 illustratively shows a block diagram of a switch control unit 35a for the multicore lockstep system 2, whereby switch logic 34a-c is controlled to be open/closed based on or in response to switch control signals 36a-c from switch control unit 35a.

In FIG. 3, the switch control unit 35a comprises an oscillator 40 to generate an output signal 41, and counter 42a to generate the one or more switch control signals 36a-c based on or in response to the output signal 41.

Core clock signal 37a-c are provided to the respective cores 4a-c such that the cores 4a-c operate in lockstep with each other. The core clock signals 37a-c may be regenerated using a phase-locked loop (PLL) from a master clock signal (not shown).

The oscillator 40 may also generate the output signal 41 in phase with a core clock signal 37a-c or a master clock signal for example by means of a PLL, whereby the frequency of the output signal 41, and therefore, the switch control signals 36a-c are configurable dependent on the operation of one or more of the cores 4a-c.

For example, when the cores 4a-c are operating in normal mode (e.g. at 1.6 GHz), switch control unit 35a will control the switch logic 34a-c in synchronisation with a core clock signal or a master clock signal. As a further illustrative example, when the cores 4a-c are operating outside of normal mode (e.g. at KHz or MHz speeds in sleep mode), the switch control unit 35a will control the switch logic 34a-c in synchronisation with a core clock signal or a master clock signal.

In the present illustrative example, the counter 42a comprises a one-hot counter whereby the switch control signals 36a-c cause one core of the multicore system to be electrically coupled to the primary power source 31 (depicted as core 4a in FIG. 3) for any particular period of time (e.g. one or more clock cycles), with the remaining majority of the cores of the multicore system electrically isolated or power gated from the primary power source 31 (depicted as cores 4b & 4c in FIG. 3) during that particular period of time.

When electrically isolated from the primary power source 31, the electrically isolated cores are powered using a secondary power source 38a-c, which in FIG. 3 are capacitive elements depicted as respective capacitors 43a-c, each having a first terminal coupled to the respective cores 4a-c, with a second terminal coupled to respective reference nodes 44a-c (e.g. ground).

As depicted in the illustrative example of FIG. 3, each of the cores are also connected to reference node 44d (e.g. ground). Switch logic (not shown) may be provided to couple the secondary power sources 38a-c to the respective cores 4a-c when electrically isolated from the primary power source 31.

In operation, when using switch control signals from the one-hot counter 42a to control the switch logic 34a-c, a fault event at the primary power source 31 or on the power rail 32 will not affect the power gated cores 4b and 4c, and an output generated by the core 4a processing an instruction may differ from outputs from the cores 4b and 4c processing the same instruction in response to the fault event.

For a multicore lockstep system 2 in which one core is electrically coupled to the power rail and two or more cores are power gated or electrically isolated from the primary power source 31, when an output from the core electrically coupled to the primary power source 31 diverges from those of the electrically isolated cores, it can be determined that the divergence results from a fault event at the primary power source 31 or the power rail 32 (e.g. due to a CMF). Given the electrically isolated cores are not impacted by the fault event at the primary power source 31 or the power rail 32, the non-diverging outputs of those cores can be trusted. As such, the core impacted by the fault event can be identified, and an appropriate recovery action initiated by the lockstep assist unit 6.

Such an appropriate recovery action may comprise the recovery logic interrupting all cores when the fault event is detected and resynchronising the architectural states of all the cores.

An alternative recovery action may comprise the recovery logic interrupting the core affected by the fault event, but to delay interrupting the non-diverging cores. As an illustrative example, interrupting the non-diverging cores may be delayed allowing those non-diverging cores to complete a specific operation (e.g. a critical operation). The recovery logic may then interrupt and resynchronise the architectural states of all cores once the operation is complete.

Figure 4:
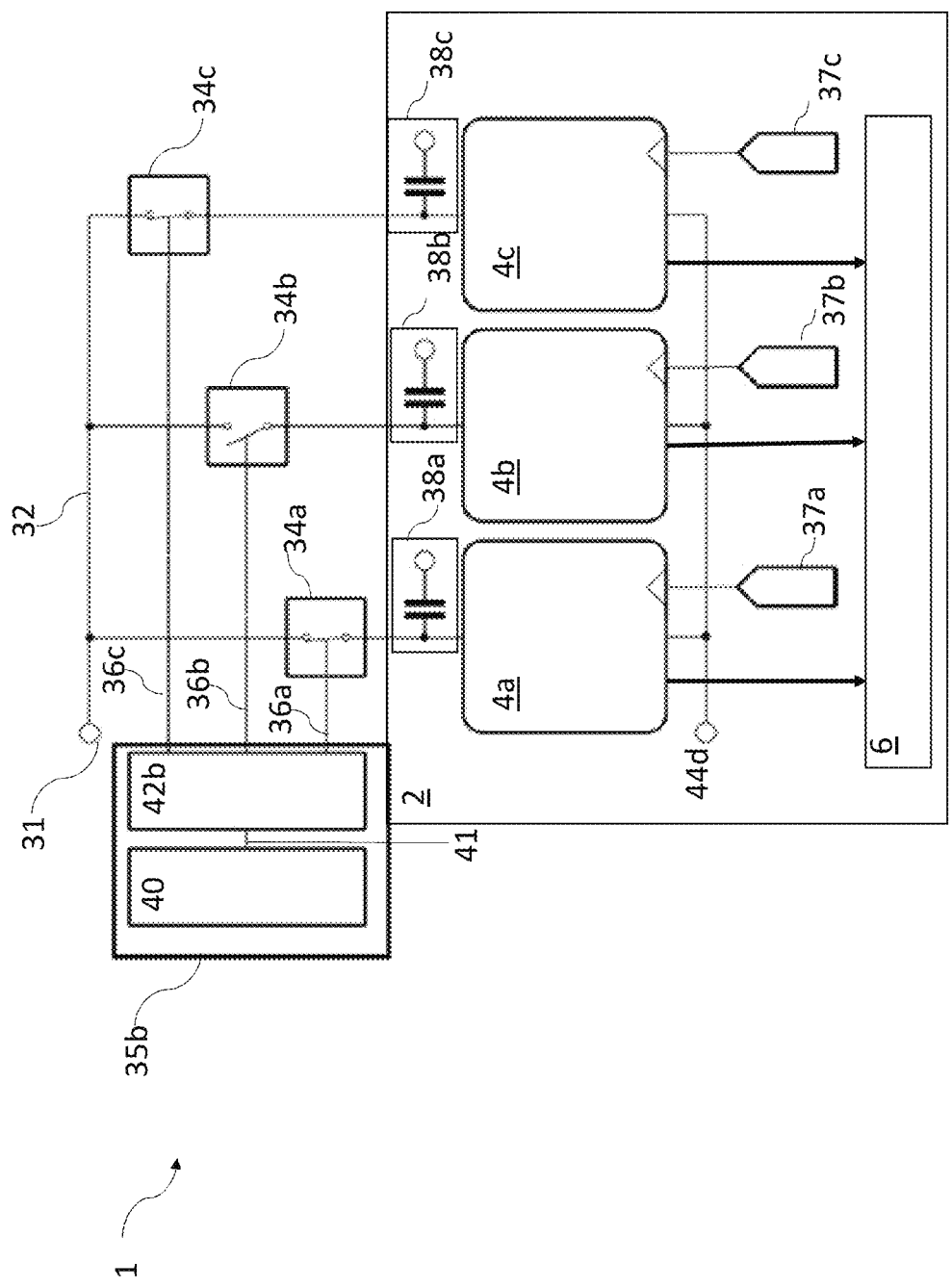
FIG. 4 illustratively shows a block diagram of a switch control unit for the multicore lockstep system of FIG. 2 according to an embodiment.

FIG. 4 illustratively shows a block diagram of a switch control unit 35b for the multicore lockstep system 2, whereby switch logic 34a-c is controlled to be open/closed based on or in response to switch control signals 36a-c from switch control unit 35b.

In FIG. 4, the switch control unit 35b comprises an oscillator 40 to generate an output 41 as described above, and a counter 42b to generate the one or more switch control signals 36a-c based on or in response to the output 41.

In the present illustrative example, the counter 42b comprises a one-cold counter whereby the switch control signals 36a-c cause one core of the multicore system to be electrically isolated from the primary power source 31 (depicted as 4b in FIG. 4) for any particular period of time (e.g. one or more clock cycles), with the remaining majority of the cores electrically coupled to the primary power source 31 (depicted as cores 4a and 4c in FIG. 4).

As above, the electrically isolated core is powered using respective secondary power source 38a-c. In operation a fault event at the primary power source 31 or on the power rail 32 will not affect the power gated core 4b, and an output generated by the core 4b processing an instruction may differ from cores 4a and 4c processing the same instruction in response to the fault event.

The lockstep assist unit 6 will therefore detect the fault event by identifying divergence between the outputs of the non-power gated cores 4a and 4c and the power gated core 4b.

An appropriate recovery action may be initiated by the lockstep assist unit 6. Such an action may be to interrupt and resynchronise the architectural states of all cores once a fault event is detected.

In an alternative embodiment, as only one core is power gated for a particular period of time in FIG. 4, it may not be possible to determine which core(s) is(are) affected by the CMF fault event.

However, when the output of the power gated core matches at least one of the non-power gated cores, then the system may determine that fault event is not a CMF affecting both non-power gated cores, and continue to perform one or more operations with the cores whose outputs match if determined to be appropriate to do. Such functionality may be beneficial when the cores are performing a critical operation, whereby the lockstep assist unit 6 may delay interrupting the cores whose outputs match until after the critical operation is complete. The outputs of the remaining cores may be monitored to detect a further fault event.

Alternatively, the lockstep unit may only delay interrupting the power gated core and continue performing the critical operation with the single remaining core which was power gated for the period of time for which the fault event was detected.

Such functionality means that the critical operation can be completed even after the fault event is detected, whereby the determination to continue processing with one more cores may be made when, for example, the risk of delaying completing a particular operation outweighs the risk of interrupting all cores and restarting the operation with all cores.

As described above, the counter 42a of FIG. 3 comprises a one-hot counter to power gate a majority of the cores from the primary power source 31 for a particular period of time (e.g. one or more clock cycles). As also described above the counter of 42b of FIG. 4 comprises a one-cold counter to power gate a minority of the cores from the primary power source 31 for a particular period of time.

In an example embodiment, the system may comprise circuitry or logic which is configurable to function as a one-hot counter or a one-cold counter dependent on one or more criteria (e.g. system, user, and/or application requirements).

The criteria may be defined for example by a user setting a hardware switch (e.g. on or off), or by an application setting the value of a flag (e.g. 1 or 0) in a register, whereby the system will configure the counter as a one-hot counter or one-cold counter based on or in response to the value of the hardware switch or flag. It will be appreciated that these examples of defining the criteria by the hardware switch or flag are exemplary only and suitable means of defining the criteria may be used.

As an illustrative example, controlling the switch logic using the one-cold counter may be more power efficient in comparison to controlling the switch logic using the one-hot counter (due to the switching involved). Therefore, the counter may be configured to function as a one-hot counter when the primary power source is above a threshold voltage level, and configured to function as a one-cold counter when the primary power source falls below the threshold voltage level. Such functionality means that the lifetime of the primary power source can be extended.

As a further illustrative example, power gating a majority of cores in a TCLS configuration (e.g. using a one-hot counter) allows for both detection of a fault event (e.g. a CMF) at the primary power source 31 or along the power rail 32, and also allows for identification of the core affected by the fault event (e.g. when the output of the core electrically coupled to the primary power source diverges from the outputs of the cores power gated from the primary power source the core coupled to the primary power source is determined to be affected by the fault event).

On the other hand, power gating a minority of cores in a TCLS configuration (e.g. using a one-cold counter) allows for detection of a fault event (e.g. a CMF) at the primary power source 31 or along the power rail 32 but may not allow for identification of the particular core or cores affected by the fault event to be identified. Therefore, when, for example, performance criteria only requires detection of a fault event in a TCLS configuration the counter may be configured to function as a one-cold counter, whilst when the performance criteria necessitates that the fault event be detected and the core affected by the fault event to be identified, the counter may be implemented as a one-hot counter. It will also be appreciated that for a multicore system comprising 'n' cores (where 'n' is an integer greater than 1), power gating a subset of the cores (e.g. a minority of cores, the same number of cores, or a majority of the cores) from a common primary power source for a particular period of time (e.g. one or more clock cycles) whilst powering the power gated cores from a secondary power source, provides for detection of a fault event (e.g. a CMF) at the primary power source or power rail based on or in response to the resultant output from the lockstepped cores, whilst power gating all but one of the 'n' cores allows for the core affected by the fault event to be identified and an appropriate recovery action initiated.

Figure 5:
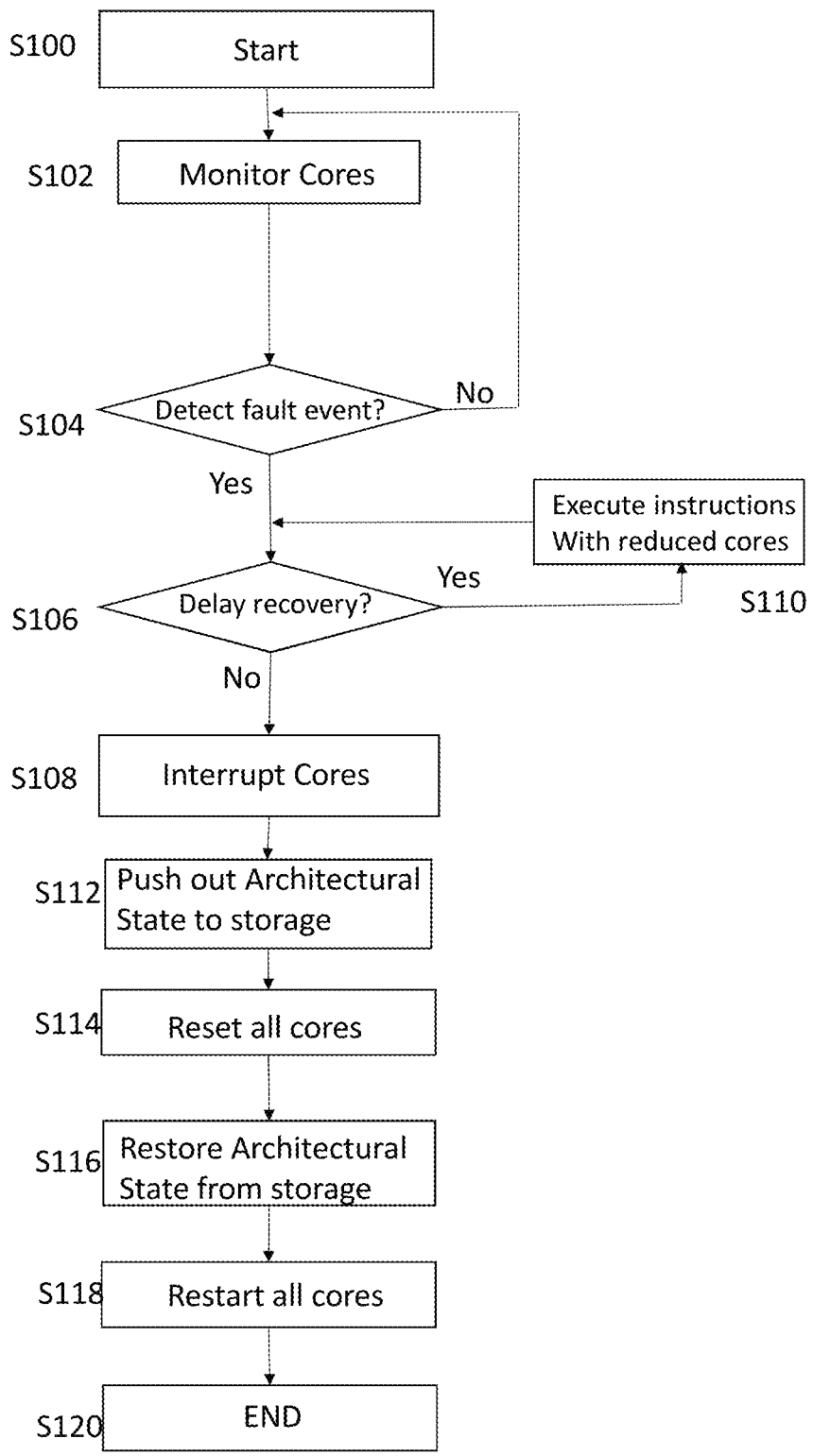
FIG. 5 illustratively shows a simplified flow diagram of a method for detecting fault events in a multicore lockstep system.

FIG. 5 illustratively shows a simplified flow diagram of a method for monitoring for fault events in a multicore lockstep system (e.g. a TCLS configuration) whereby at step S100 the method starts, and all cores process one or more instructions in lockstep over one or more clock cycles.

At step S102 the outputs from the cores are monitored by error detection circuitry, whereby the outputs are based on or in response to processing the instruction.

At step S104, when a fault event is not detected the cores continue to operate and their subsequent outputs monitored.

At step S104, when a fault event is detected (e.g. divergence in the outputs from the cores) the recovery circuitry 26 determines at step S106 whether the cores should be interrupted and recovered immediately or whether recovery of one or more of the cores should be delayed to complete processing of one or more instructions (e.g. to complete a critical operation). When it is determined that recovery should not be delayed, the cores are interrupted at step S108.

When it is determined that recovery should be delayed, the one or more of the cores continue to process instructions at step S110.

As an illustrative example, when two cores are power gated for a particular period of time (e.g. when using a one-hot counter), the power gated cores can be determined to be unaffected by a CMF error event when their outputs do not diverge but the output of a non-power gated core produces an unexpected result.

As a further illustrative example, the output of a non-power gated core may also be taken to be unaffected by a CMF error event when the output thereof diverges from another non-power gated core but does not diverge from the output of a power gated core.

Therefore, the assist unit may determine that recovery of the cores which are not affected by a CMF fault event can continue to process instructions. When the cores complete processing of instructions, or after a delay (e.g. a time delay), the recovery logic will interrupt the remaining cores as at step S108. Such functionality prevents the interruption of cores processing safety critical instructions until processing of the safety critical instructions is complete.

Such functionality also means that cores will only be interrupted when the assist unit determines it safe to do so (e.g. when the cores are not processing instructions relating to a critical operation) thereby meeting hard real-time performance requirements.

Such functionality also means that fault events can also be detected from outputs of the remaining cores and an appropriate recovery process initiated as appropriate thereby maintaining the integrity of the outputs from the remaining cores during the critical operations.

The lockstep assist unit may continue to detect fault events during processing of instructions by the remaining cores, whereby when two cores are allowed to operate to complete critical operation, those cores may operate in a dualcore lockstep (DCLS) configuration, with any fault events detected by the assist unit being actioned appropriately.

In an illustrative example, the lockstep assist unit may determine that the cores should not be interrupted during a sequence of one or more instructions by checking the value of a flag in a register on one or more of the cores or on the assist unit itself, whereby the flag in that register may be set when the "critical section start" instruction is fetched from storage (e.g. from I-Cache), on decoding the instruction or executing instruction, although the claims are not limited in this respect. The value of the flag may be changed when the cores complete execution for a particular operation using the "critical section end" instruction, indicating that all cores can be interrupted again.

At step S112 the architectural state (e.g. register files, program counter and state registers) of the power gated cores or those cores identified as not being affected by the fault is pushed out to the voter circuitry (e.g. majority voter circuitry) and voted on, and the output of the voter circuitry stored in the storage circuitry (e.g. TCM 12).

At step S114, the cores are reset to remove any soft errors that might remain in the respective architectures (e.g. by flushing the respective pipelines of the cores). In embodiments the resynchronisation circuitry issues a reset signal to the cores to perform the reset.

At step S116, the architectural state previously stored in the storage circuitry is restored into all of the cores, and at step S118 the cores restart processing instructions at the point where the cores were interrupted (e.g. as determined from the program counter).

At step S120, the method ends.

Whilst the techniques described above provide detection of CMF fault events occurring at a common power source and/or along a common power rail of a multicore lockstep system, the techniques also provide protection against fault events occurring on other components in the system (e.g. clock lines, buss(es), switch control units).

Figure 6:
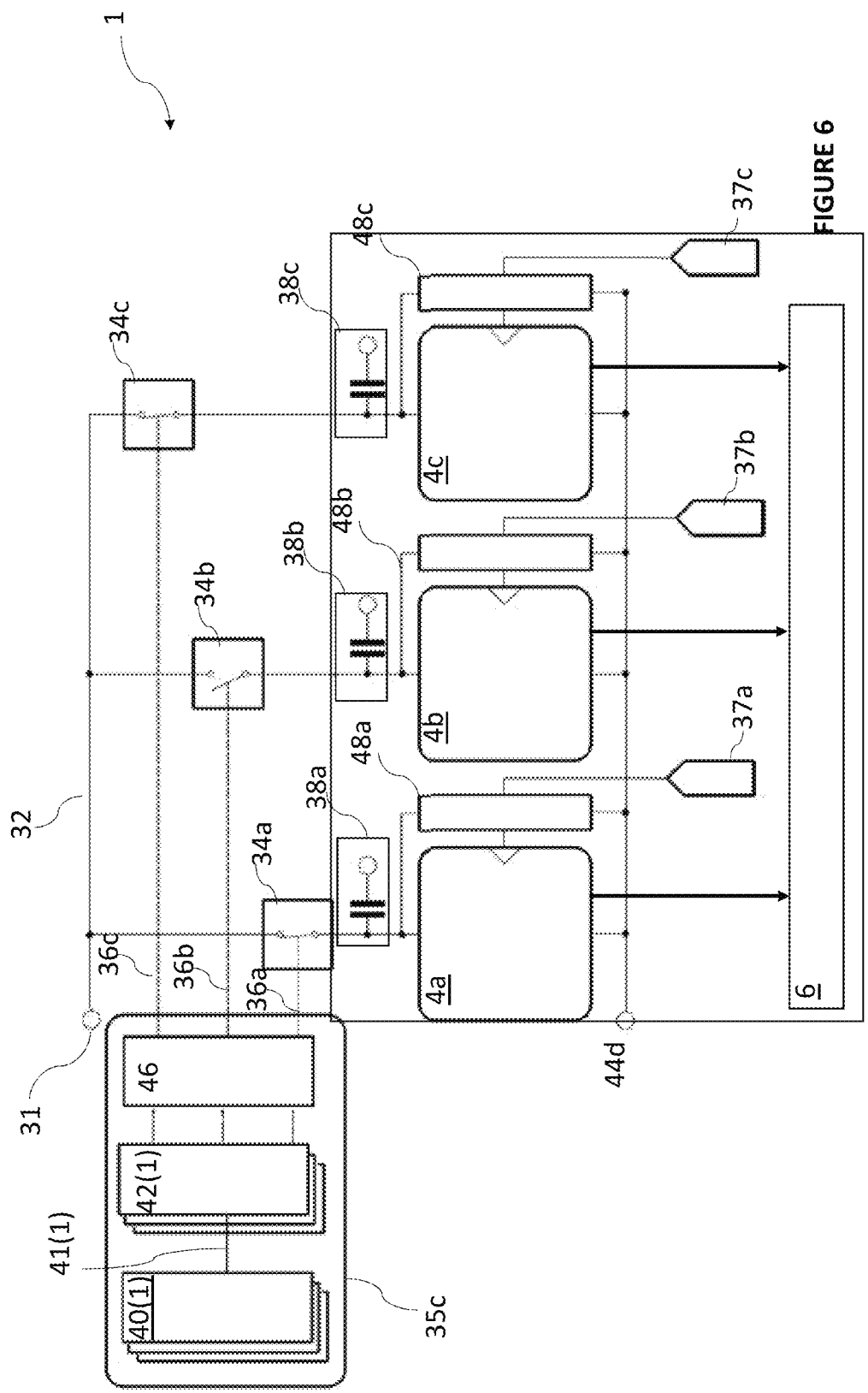
FIG. 6 illustratively shows block diagram of the multicore lockstep system of FIG. 2 according to an embodiment.

FIG. 6 illustratively shows an illustrative example of the multicore lockstep system 2 whereby various components in the system 1 are provided with mechanisms to protect against fault events which may affect the various components.

As an illustrative example, the switch control unit 35c of FIG. 6 is provided with time-diverse protection whereby two or more oscillators 40(1)-40(n) generate the same output signal 41(1)-41(n) at different times (e.g. after a delay of one or more clock cycles).

The switch control unit 35c also comprises counters 42(1)-42(n) to generate signals in response to the respective output signals 41(1)-41(n). As above, the counters 42(1)-42(n) may be configured to operate, for example, as one-hot or one-cold counters.

The switch control unit 35c also comprises error detection circuitry 46 to identify divergence between the signals from the respective counters 42(1)-42(n), whereby the divergence may be caused by a CMF affecting, for example: an oscillator 40(1)-40(n), a data line for an output signal 41(1)-41(n), a counter 42(1)-42(n) and/or a clock line or clock signal (not shown) provided to one or more of the oscillators.

When it is determined that no fault event occurred, the switch control signals 36a-c will be output from the switch control unit 35c to control the switch logic 34a-c as described above. As each output signal 41(1)-41(n) generated by the respective oscillators 40(1)-40(n) and counters 42(1)-42(n) are repeating signals (based on or in response to, for example, the core clock or a master clock), any latency to detect a fault event affecting the switch control unit 35c will not affect the performance of the cores 4a-4c.

As a further illustrative example, filters (depicted as clock filters 48a-c) may be provided on the clock lines to the respective cores 4a-c to prevent or detect fault events which may occur thereon. As will be appreciated by a person of skill in the art having taken account of this specification, such filters may be as simple as filter components which ensure minimal pulse length or as complex as full oscillators with a PLL lock to a master clock (and gated from the master clock whilst power gated).

Additionally or alternatively, filters may be provided on the control busses or lines in the system to prevent or detect fault events which may occur thereon. Such control lines may for example include the power rails 32 or on the lines through which the switch control signals are provided to the switch logic 34a-c.

Figure 7:
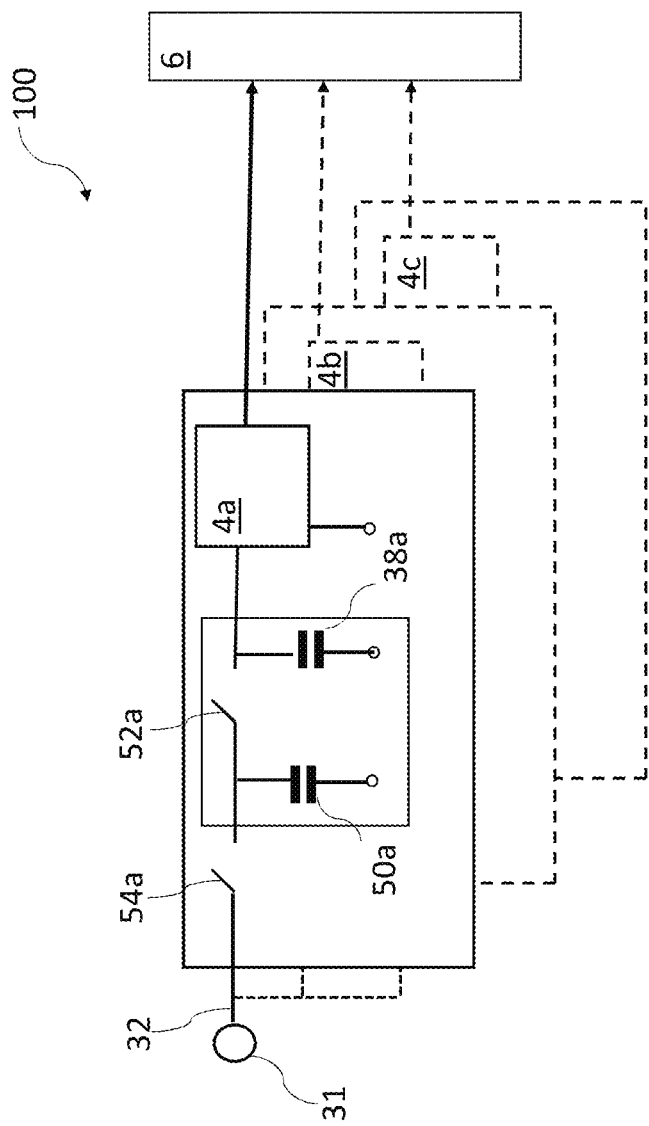
FIG. 7 illustratively shows a block diagram of a switch control unit for a multicore lockstep system according to an embodiment.

FIG. 7 illustratively shows a block diagram of a system 100 in which a plurality of cores 4a-4c are configured to operate in lockstep with each other, and are each powered from a respective power source 38a, and whereby the cores 4a-4c are not directly electrically coupled to the common power source 31 (e.g. VDD). Such a configuration mitigates against CMF fault events at a common power source 31 and/or along common power rail 32.

In operation, core 4a is powered by the power source 38a, whereby power source 38a is charged from charging capacitor 50a when switch logic 52a is open/closed at an appropriate duty cycle, whist maintaining switch logic 54a open.

The charging capacitor 50a is charged from the common power source 31 when switch logic 54a is opened/closed at an appropriate duty cycle, whilst switch logic 52a is maintained open so as to electrically decouple the core 4a from the common power source 31 whist capacitor 50a is charged.

Such functionality means that as the cores 4a-4c are powered by associated power sources 38a-c, fault events at a common power source 31 or on power line 32 will not affect the cores, although the lockstep assist unit 6 will detect divergence from the outputs of the different cores in response to other fault events and initiate an appropriate recovery action as described above.

In FIGS. 1-7 above, the secondary power sources are generally depicted as a plurality of independent power sources, whereby each secondary power source is associated with an individual core of the multicore system.

However, the claims are not limited in this respect and in some embodiments, two or more cores may be electrically coupled to the same secondary power source. For example, a single secondary power source may be multiplexed between two or more cores (e.g. when the two or more cores are power gated from a primary power source). As an illustrative example, two individual capacitive elements (e.g. two external decoupling capacitors) may be arranged as secondary power sources, such that the first capacitive element is electrically coupled to a first subset of cores power gated from a primary power source for a first period of time (e.g. one or more clock cycles), whilst the second capacitive element is decoupled from the cores and charged (e.g. from the primary power source) during the first period of time. For a second time period (e.g. one or more clock cycles), the second capacitive element is electrically coupled to a second subset of cores power gated from the primary power source, whilst the first capacitive element is decoupled from all cores and charged (e.g. from the primary power source) during the second period of time. Such functionality means that when there are three or more cores in a multicore lockstep system, the number of capacitive elements provided as secondary power sources can be reduced in comparison to providing individual capacitive elements for each core.

Furthermore, the figures generally depict the primary and secondary power sources as being coupled to common power lines, and electrically coupled/decoupled to/from the power lines when required (e.g. by switch logic), whereby such functionality may provide for electrically charging of the secondary power source from the primary power source.

However, the claims are not limited in this respect and in some embodiments the secondary power sources may be electrically isolated from the primary power source, e.g. by means of independent power lines provided for each power source.

In other embodiments, the capacitive element may comprise a "virtual" capacitive element spread across the surface of the processor system, the multicore system and/or one or more of the cores.

Although the description above generally describes systems comprising cores to operate in a TCLS configuration, it will be appreciated that the techniques are applicable to multicore systems having any number of cores operating in lockstep.

It will be appreciated that the techniques described above can be used in many applications.

As an illustrative example, the systems and methods may be used in devices operating in harsh environments such as in spacecraft, satellites, power stations etc., whereby as an illustrative example, processors fabricated using rad-hard technology may implement the techniques. As a further illustrative, the systems and methods may be used in safety-critical applications such as in autonomous drive vehicles, marine craft and aircraft. It will be appreciated that the applications described above are exemplary only and the claims are not limited in this respect.

Embodiments of the present techniques provide a non-transitory data carrier carrying code which, when implemented on a processor, causes the processor to carry out the methods described herein.

The techniques further provide processor control code to implement the above-described methods, for example on a general-purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object-oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

It will be understood that, although the terms first, second, etc. may be used herein to describe various features, these features should not be limited by these terms. These terms are only used to distinguish one feature from another. Furthermore, the term "and/or" includes any and all combinations of one or more of the associated listed items.

Furthermore, the terminology used herein is for the purpose of describing embodiments only and is not intended to be limiting. For example, as used herein the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In the preceding description, various embodiments of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

Accordingly, some aspects and features of the disclosed embodiments are set out in the following numbered items:

1. A method of monitoring for a fault event in a lockstep processing system comprising a plurality of cores configured to operate in lockstep, the method comprising: power gating, for a period of time, a subset of cores of the plurality of cores from a first power source and providing power to the subset of cores from a second power source for the period of time; processing, at each of the cores of the plurality of cores, one or more instructions; providing an output from each core of the plurality of cores to error detection circuitry to monitor for the fault event, the output from each core based on or in response to processing the one or more instructions during the period of time.

2. The method of item 1, further comprising detecting a fault event when the output from a first core of the plurality of cores diverges from the output of a second core of the plurality of cores.

3. The method of item 2, further comprising identifying a core affected by the fault event.

4. The method of item 1, wherein power gating the subset of the plurality of cores comprises power gating a majority of the cores from the first power source.

5. The method of item 4, wherein power gating the majority of the cores comprises: controlling switch logic to power gate respective cores of the plurality of cores with switch control signals generated based on or in response to outputs from a one hot counter.

6. The method of item 1, wherein power gating the subset of the plurality of cores comprises power gating a minority of the cores.

7. The method of item 6, wherein power gating the minority of the cores comprises: controlling switch logic to power gate respective cores of the plurality of cores with switch control signals generated based on or in response to outputs from a one cold counter.

8. The method of item 5, comprising: controlling the switch logic to power gate respective cores based on or in response to one or more criteria.

9. The method of item 1, comprising initiating a recovery action in response to detecting the fault event.

10. The method of item 9, wherein the recovery action comprises: resynchronising the states of the plurality of cores.

11. The method of item 9, wherein the recovery action comprises: performing one or more operations with one or more cores of the plurality of cores.

12. The method of item 1, wherein the period of time comprises one or more clock cycles.

13. The method of item 1, wherein the plurality of cores are arranged in a triple core lockstep configuration.

14. The method of item 1, further comprising: power gating the subset of the plurality of cores from the primary power source in synchronisation with one of a core clock signal and a master clock signal.

15. A non-transitory computer readable storage medium comprising code which when implemented on a processor causes the processor to carry out a method of monitoring for a fault event in a lockstep processing system comprising a plurality of cores configured to operate in lockstep, the method comprising: power gating, for a period of time, a subset of cores of the plurality of cores from a first power source and providing power to the subset of cores from a second power source; processing, at each of the cores of the plurality of cores, one or more instructions; providing an output from each core of the plurality of cores to error detection circuitry to monitor for the fault event, the output from each core based on or in response to processing the one or more instructions during the period of time.

16. A processor system comprising: a plurality of cores to process instructions in a lockstep configuration; a control unit to power gate, for a period of time, a subset of the plurality of cores from a first power source and provide power to the subset of cores from a second power source; and error detection circuitry to receive outputs from each of the plurality of cores to monitor for a fault event during the period of time.

17. The system of item 16, wherein the subset of the plurality of cores comprises one of: a majority of the cores and a minority of the cores.

18. The system of item 16, wherein the control unit is configured to operate as one of: a one-hot counter and a one-cold counter.

19. The system of item 16, wherein the first power source comprises a power source common to the plurality of cores.

20. The system of item 16, further comprising recovery circuitry to initiate a recovery action when a fault event is detected.

The invention claimed is:

1. A method of monitoring for a fault event in a lockstep processing system comprising a plurality of cores configured to operate in lockstep, the method comprising:
power gating, for a period of time, a subset of cores of the plurality of cores from a first power source and providing power to the subset of cores from a second power source for the period of time;
processing, at each of the cores of the plurality of cores, one or more instructions;
providing an output from each core of the plurality of cores to error detection circuitry to monitor for the fault event, the output from each core based on or in response to processing the one or more instructions during the period of time.

2. The method of claim 1, further comprising detecting a fault event when the output from a first core of the plurality of cores diverges from the output of a second core of the plurality of cores.

3. The method of claim 2, further comprising identifying a core affected by the fault event.

4. The method of claim 1, wherein power gating the subset of the plurality of cores comprises power gating a majority of the cores from the first power source.

5. The method of claim 4, wherein power gating the majority of the cores comprises:
controlling switch logic to power gate respective cores of the plurality of cores with switch control signals generated based on or in response to outputs from a one hot counter.

6. The method of claim 1, wherein power gating the subset of the plurality of cores comprises power gating a minority of the cores.

7. The method of claim 6, wherein power gating the minority of the cores comprises:
controlling switch logic to power gate respective cores of the plurality of cores with switch control signals generated based on or in response to outputs from a one cold counter.

8. The method of claim 5, comprising:
controlling the switch logic to power gate respective cores based on or in response to one or more criteria.

9. The method of claim 1, comprising initiating a recovery action in response to detecting the fault event.

10. The method of claim 9, wherein the recovery action comprises:
resynchronising the states of the plurality of cores.

11. The method of claim 9, wherein the recovery action comprises:
performing one or more operations with one or more cores of the plurality of cores.

12. The method of claim 1, wherein the period of time comprises one or more clock cycles.

13. The method of claim 1, wherein the plurality of cores are arranged in a triple core lockstep configuration.

14. The method of claim 1, further comprising:
power gating the subset of the plurality of cores from the primary power source in synchronisation with one of a core clock signal and a master clock signal.

15. A non-transitory computer readable storage medium comprising code which when implemented on a processor causes the processor to carry out a method of monitoring for a fault event in a lockstep processing system comprising a plurality of cores configured to operate in lockstep, the method comprising:
power gating, for a period of time, a subset of cores of the plurality of cores from a first power source and providing power to the subset of cores from a second power source;
processing, at each of the cores of the plurality of cores, one or more instructions;
providing an output from each core of the plurality of cores to error detection circuitry to monitor for the fault event, the output from each core based on or in response to processing the one or more instructions during the period of time.

16. A processor system comprising:
a plurality of cores to process instructions in a lockstep configuration;
a control unit to power gate, for a period of time, a subset of the plurality of cores from a first power source and provide power to the subset of cores from a second power source; and
error detection circuitry to receive outputs from each of the plurality of cores to monitor for a fault event during the period of time.

17. The system of claim 16, wherein the subset of the plurality of cores comprises one of: a majority of the cores and a minority of the cores.

18. The system of claim 16, wherein the control unit is configured to operate as one of:
a one-hot counter and a one-cold counter.

19. The system of claim 16, wherein the first power source comprises a power source common to the plurality of cores.

20. The system of claim 16, further comprising recovery circuitry to initiate a recovery action when a fault event is detected.

* * * * *